United States Patent
Inoue et al.

(10) Patent No.: US 12,473,209 B2
(45) Date of Patent: Nov. 18, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Katsuya Inoue, Hyogo (JP); Takeshi Ogasawara, Osaka (JP); Yoshinori Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 659 days.

(21) Appl. No.: 17/792,879

(22) PCT Filed: Dec. 1, 2020

(86) PCT No.: PCT/JP2020/044691
§ 371 (c)(1),
(2) Date: Jul. 14, 2022

(87) PCT Pub. No.: WO2021/152997
PCT Pub. Date: Aug. 5, 2021

(65) Prior Publication Data
US 2023/0072002 A1 Mar. 9, 2023

(30) Foreign Application Priority Data
Jan. 27, 2020 (JP) .................. 2020-010940

(51) Int. Cl.
*H01M 4/525* (2010.01)
*C01G 53/42* (2025.01)
(Continued)

(52) U.S. Cl.
CPC ............ *C01G 53/42* (2013.01); *H01M 4/366* (2013.01); *C01P 2002/52* (2013.01);
(Continued)

(58) Field of Classification Search
CPC ........ C01G 53/42; C01G 53/50; C01G 53/82; C01P 2002/52; C01P 2002/76;
(Continued)

(56) References Cited

U.S. PATENT DOCUMENTS

| 7,749,657 B2 | 7/2010 | Hamano et al. |
| 2002/0061444 A1 | 5/2002 | Kweon et al. |

(Continued)

FOREIGN PATENT DOCUMENTS

| CN | 102054985 A | 5/2011 |
| CN | 106030873 A | 10/2016 |

(Continued)

OTHER PUBLICATIONS

"Takeuchi et al., JP-2009129820-A—Translated, Jun. 11, 2009" (Year: 2009).*
(Continued)

*Primary Examiner* — Milton I Cano
*Assistant Examiner* — Jesse J Efymow
(74) *Attorney, Agent, or Firm* — WHDA, LLP (57) ABSTRACT

This positive electrode active material for nonaqueous electrolyte secondary batteries contains: a lithium transition metal composite oxide having secondary particles, each of which is formed of aggregated primary particles; and a surface modification layer which is formed on the surface of each primary particle of the lithium transition metal composite oxide. The lithium transition metal composite oxide contains at least Al and 80% by mole or more of Ni relative to the total number of moles of the metal elements excluding
(Continued)

Li; and the surface modification layer contains at least Ba, and at least one of Sr and Ca.

8 Claims, 1 Drawing Sheet

(51) Int. Cl.
*H01M 4/36* (2006.01)
*H01M 4/02* (2006.01)

(52) U.S. Cl.
CPC ...... *C01P 2004/50* (2013.01); *C01P 2006/40* (2013.01); *H01M 2004/028* (2013.01); *H01M 4/525* (2013.01)

(58) Field of Classification Search
CPC .............. C01P 2004/50; C01P 2004/51; C01P 2004/61; C01P 2004/64; C01P 2004/80; C01P 2004/82; C01P 2004/84; C01P 2006/40; H01M 4/362; H01M 4/366; H01M 4/505; H01M 4/525; H01M 2004/028; Y02E 60/10
See application file for complete search history.

(56) References Cited

U.S. PATENT DOCUMENTS

| | | | |
|---|---|---|---|
| 2006/0166091 A1* | 7/2006 | Deguchi | H01M 4/525 429/231.1 |
| 2006/0204849 A1 | 9/2006 | Saito et al. | |
| 2011/0111298 A1 | 5/2011 | Lopez et al. | |
| 2017/0012289 A1 | 1/2017 | Kawakita et al. | |
| 2018/0083279 A1 | 3/2018 | Takami et al. | |
| 2018/0316005 A1* | 11/2018 | Shin | H01M 4/0471 |
| 2019/0067689 A1* | 2/2019 | Hong | H01M 10/0525 |
| 2019/0115596 A1 | 4/2019 | Kajiyama et al. | |
| 2023/0065418 A1* | 3/2023 | Kawakita | H01M 4/366 |

FOREIGN PATENT DOCUMENTS

| | | | | |
|---|---|---|---|---|
| EP | 3162765 B1 | 8/2018 | | |
| JP | 10-79250 A | 3/1998 | | |
| JP | 11-317230 A | 11/1999 | | |
| JP | 2002-260659 A | 9/2002 | | |
| JP | 2009129820 A | * 6/2009 | | |
| JP | 2013-511129 A | 3/2013 | | |
| JP | 5245210 B2 | 7/2013 | | |
| JP | 2018-045965 A | 3/2018 | | |
| JP | 2019-46795 A | 3/2019 | | |
| WO | 2006/095594 A1 | 9/2006 | | |
| WO | 2017/170548 A1 | 10/2017 | | |
| WO | WO-2017168274 A1 | * 10/2017 | ............. | C01G 53/50 |
| WO | WO-2018043669 A1 | * 3/2018 | ............. | C01G 53/00 |

OTHER PUBLICATIONS

Office Action dated Feb. 28, 2024, issued in counterpart CN Application No. 202080093594.9, with English translation. (9 pages).
International Search Report dated Jan. 26, 2021, issued in counterpart International Application No. PCT/JP2020/044691 (2 pages).
Extended (Supplementary) European Search Report dated Jul. 20, 2023, issued in counterpart EP application No. 20916679.2. (6 pages).
Li, Yu et al., "Surface modification of Sr-doped LaMnO3 coating by spray drying on Ni-rich LiNi0.8Mn0.1Co0.1O2 cathode material for lithium-ion batteries", Journal of the Taiwan Institute of Chemical Engineers, Jun. 2019, vol. 102, pp. 225-232, cited in EP Extended European Search Report dated Jul. 20, 2023. (8 pages).
Office Action dated Apr. 30, 2025, issued in counterpart JP Application No. 2021-574489. (5 pages).

* cited by examiner

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. 8371 of International Application No. PCT/JP2020/044691 filed on Dec. 1, 2020 which claims the benefit of priority under 35 U.S.C. § 119 (a) of Japanese Patent Application No. 2020-010940 filed in Japan on Jan. 27, 2020, the contents of which are incorporated herein by reference.

TECHNICAL FIELD

The present disclosure relates to a positive electrode active material for non-aqueous electrolyte secondary battery and a non-aqueous electrolyte secondary battery.

BACKGROUND

In recent years, as a high-output, high-capacity secondary battery, a non-aqueous electrolyte secondary battery is widely used, which comprises a positive electrode, a negative electrode, and a non-aqueous electrolyte, and in which charging/discharging is performed by causing lithium ions or the like to move between the positive electrode and the negative electrode. From the perspective of achieving low resistance and high capacity in the battery, it is desired to improve the characteristics of the positive electrode, active material contained in the positive electrode of the battery.

For example, Patent Literature 1 discloses, as a positive electrode active material for high-power applications, an NCA-based (nickel-cobalt-aluminum-based) positive electrode active material having a layered structure and having a trace amount of alkaline earth metal dissolved in a solid solution state.

CITATION LIST

Patent Literature

PATENT LITERATURE 1: Japanese Patent No. 5245210

SUMMARY

Regarding a lithium transition metal composite oxide contained in the positive electrode active material, a design in which the Ni content is increased may be contemplated in order to obtain a high discharge capacity. However, when the ratio of Ni to the total number of moles of metal elements excluding Li is 80 mol % or more, the layered structure of the lithium transition metal composite oxide may become unstable, and the battery capacity may become decreased with repeated charge/discharge cycles. The technique of Patent Literature 1 does not consider a decrease in battery capacity resulting from repeated charge/discharge cycles, and still has room for improvement.

A positive electrode active material for non-aqueous electrolyte secondary battery according to one aspect of the present disclosure includes a lithium transition metal composite oxide having secondary particles formed by agglomeration of primary particles, and a surface modification layer formed on the surface of the primary particles of the lithium transition metal composite oxide, wherein: the lithium transition metal composite oxide at least contains Ni in an amount of 80 mol % or more relative to the total number of moles of metal elements excluding Li, and Al; and the surface Modification layer at least contains at least one of Sr or Ca, and Ba.

A non-aqueous electrolyte secondary battery according to one aspect of the present disclosure has a positive electrode including the above-described positive electrode active material for non-aqueous electrolyte secondary battery, a negative electrode, and a non-aqueous electrolyte.

According to a positive electrode active material for non-aqueous electrolyte secondary battery according to one aspect of the present disclosure, it is possible to provide a non-aqueous electrolyte secondary battery having a high output and an improved charge/discharge cycle characteristic.

DESCRIPTION OF EMBODIMENTS

A layered structure of a lithium transition Metal composite oxide include a layer of transition metal such as Ni, a Li layer, and an oxygen layer, and the battery charge/discharge reaction proceeds as a result of the Li ions present in the Li layer reversibly moving in and out. Here, in the lithium transition metal composite oxide contained in the positive electrode active material, when the ratio of Ni to the total number of moles of metal elements excluding Li is 80 mol % or more, a large amount of Li ions are drawn out from the Li layer at the time of charging of the battery, and the layered structure may thereby become unstable. On the surface of the lithium transition metal composite, oxide whose layered structure has become unstable, an altered layer forms due to reaction with the electrolyte. With the altered layer being the starting point, structural change of the transition metal composite oxide progresses further, so that the battery capacity gradually decreases with repeated charging/discharging. However, as in a positive electrode active material for non-aqueous electrolyte secondary battery according to one embodiment of the present disclosure, by having at least one of Sr or Ca contained in a predetermined amount in a surface modification layer formed on the surface of the lithium transition metal composite oxide, its synergistic effect with Al suppresses the reaction with the electrolyte solution at the surface and stabilizes the surface structure, so that the decrease in battery capacity that would result from repeated charge/discharge cycles can be suppressed. Since Al does not change oxidation number even during charging and discharging, it is presumed that the structure of the transition metal layer is stabilized by having Al contained in the transition metal layer. It is presumed that Sr and Ca can impart a change to the surface state of the lithium transition metal composite oxide by electronic interaction. Further, by having Ba, which has a lower electronegativity than Sr and Ca, contained in the surface modification layer, the output characteristic is also improved in addition to the discharge cycle characteristic.

An example embodiment of a non-aqueous electrolyte secondary battery according to the present disclosure will now be described in detail. Although a cylindrical battery in which a spiral-type electrode assembly is housed in a cylindrical battery housing is described below as an example, the electrode assembly is not limited to a spiral type, and may be a laminate type formed by alternately laminating a plurality of positive electrodes and a plurality of negative electrodes one by one via a separator. Further, the battery housing is not limited to those having a cylindrical shape, and may for example have a rectangular shape, a coin shape, or the like. The battery housing may be one composed of a laminate sheet including a metal layer and a resin layer.

Figure 1:
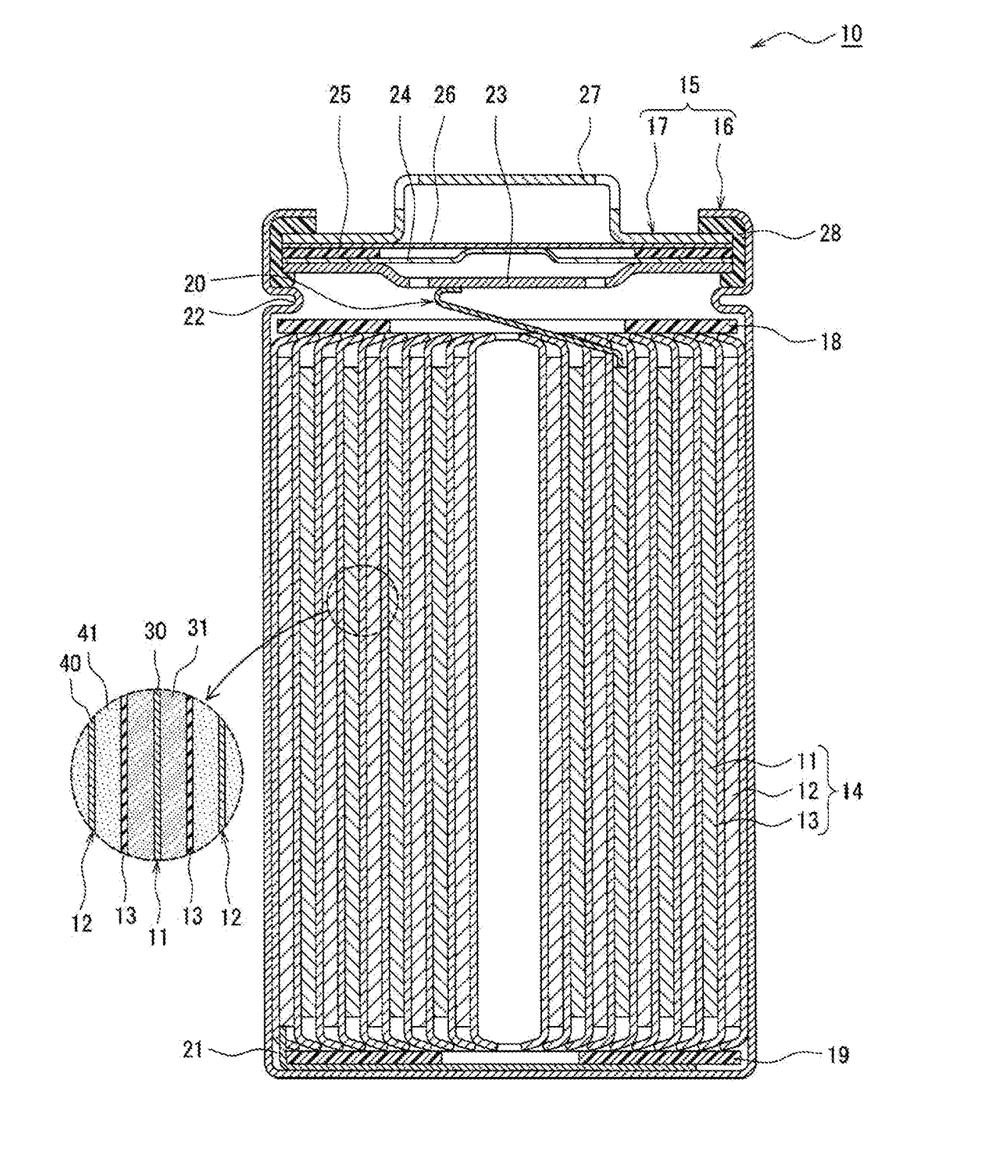
FIG. 1 is a cross-sectional view of a non-aqueous electrolyte secondary battery according to an example embodiment.

FIG. 1 is a cross-sectional view of a non-aqueous electrolyte secondary battery 10 according to an example embodiment. As shown for example in FIG. 1, the non-aqueous electrolyte secondary battery 10 comprises an electrode assembly 14, a non-aqueous electrolyte (not shown in drawing), and a battery housing 15 that houses the electrode assembly 14 and the non-aqueous electrolyte. The electrode assembly 14 has a spiral structure in which a positive electrode 11 and a negative electrode 12 are wound with separators 13 disposed between these electrodes. The battery housing 15 is composed of a bottomed cylindrical outer can 16 and a sealing assembly 17 that closes the opening of the outer can 16.

The electrode assembly 14 comprises an elongate positive electrode 11, an elongate negative electrode 12, two elongate separators 13, a positive electrode tab 20 joined to the positive electrode 11, and a negative electrode tab 21 joined to the negative electrode 12. The negative electrode 12 is formed with a size slightly larger than the positive electrode 11 in order to prevent lithium deposition. That is, the negative electrode 12 is formed longer than the positive electrode 11 in the lengthwise direction and in the width direction (i.e., the cross direction). The two separators 13 are formed with a size slightly larger than at least the positive electrode 11, and are, for example, arranged to sandwich the positive electrode 11.

The non-aqueous electrolyte secondary battery 10 comprises insulating plates 18, 19 respectively arranged above and below the electrode assembly 14. In the example shown in FIG. 1, the positive electrode tab 20 attached to the positive electrode 11 extends through a through hole in the insulating plate 18 and toward the sealing assembly 17, while the negative electrode tab 21 attached to the negative electrode 12 extends outside the insulating plate 19 and toward the bottom portion of the outer can 16. The positive electrode tab 20 is connected to the lower surface of a bottom plate 23 of the sealing assembly 17 by welding or the like, and a cap 27 of the sealing assembly 17 electrically connected to the bottom plate 23 serves as the positive electrode terminal. The negative electrode tab 21 is connected to the inner surface of the bottom portion of the outer can 16 by welding or the like, and the outer can 16 serves as the negative electrode terminal.

The outer can 16 is, for example, a bottomed cylindrical metal container. A gasket 28 is provided between the outer can 16 and the sealing assembly 17, and the internal space, of the battery housing 15 is hermetically sealed. The outer can 16 has a grooved portion 22, which is formed by, for example, pressing a side surface portion from the outside, and which supports the sealing assembly 17. The grooved portion 22 is preferably formed in an annular shape along the circumferential direction of the outer can 16, and supports the sealing assembly 17 on its upper surface.

The sealing assembly 17 has a structure obtained by laminating in order from the electrode assembly 14 side, the bottom plate 23, a lower valve member 24, an insulating member 25, an upper valve member 26, and the cap 27. Each of the members constituting the sealing assembly 17 has, for example, a disk shape or a ring shape, and the respective members except the insulating member 25 are electrically connected to each other. The lower valve member 24 and the upper valve member 26 are connected to each other at their central portions, and the insulating member 25 is interposed between peripheral edge portions of these valve members. When the internal pressure of the battery increases due to abnormal heat generation, the lower valve member 24 deforms and ruptures in a manner pushing up the upper valve member 26 toward the cap 27, and the current path between the lower valve member 24 and the upper valve member 26 is cut off. When the internal pressure increases further, the upper valve member 26 ruptures, and gas is discharged from an opening in the cap 27.

A detailed description will now be given regarding the positive electrode 11, the negative electrode 12, and the separators 13, which constitute the non-aqueous electrolyte secondary battery 10, and in particular regarding a positive electrode active material included in positive electrode active material layers 31 constituting the positive electrode 11.

[Positive Electrode]

The positive electrode 11 comprises a positive electrode current collector 30 and positive electrode active material layers 31 formed on both surfaces of the positive electrode current collector 30. As the positive electrode current collector 30, it is possible to use a foil of a metal stable in the potential range of the positive electrode 11 such as aluminum or an aluminum alloy, a film having such a metal disposed on its surface layers, or the like. The positive electrode active material layers 31 contain a positive electrode active material, a conductive material, and a binder. The thickness of the positive electrode active material layers 31 is, for example, 10 μm to 150 μm on one side of the positive electrode current collector 30. The positive electrode 11 may be produced by applying a positive electrode slurry containing the positive electrode active material, the conductive material, the binder, and the like onto the surfaces of the positive electrode current collector 30, and, after drying the applied coating, compressing the applied coating to form positive electrode active material layers 31 on both surfaces of the positive electrode current collector 30.

Examples of the conductive material contained in the positive electrode active material layers 31 include carbon materials such as carbon black, acetylene black, Ketjen black, and graphite. Examples of the binder contained in the positive electrode active material layers 31 include fluororesins such as polytetrafluoroethylene (PTFE) and polyvinylidene fluoride (PVdF), polyacrylonitrile (PAN), polyimides, acrylic resins, and polyolefins. These resins may be used in combination with carboxymethyl cellulose (CMC) or a salt thereof, polyethylene oxide (PEO), or the like.

The positive electrode active material contained in the positive electrode active material layers 31 includes a lithium transition metal composite oxide having secondary particles formed by agglomeration of primary particles, and a surface modification layer formed on the surface of the primary particles of the lithium transition metal composite oxide. With this feature, reaction with the electrolyte solution can be suppressed. Here, the surface modification layer being formed on the surface of the primary particles means that the surface modification layer is present on the surface of the secondary particles or at the interface where the primary particles are in contact with each other.

The secondary particles of the lithium transition metal composite oxide have a volume-based median diameter (D50) of preferably 3 μm to 30 μm, more preferably to 25 μm, and particularly preferably 7 μm to 15 μm. D50 means a particle size at which, in a volume-based particle size distribution, the cumulative frequency from the smaller particle size side reaches 50% and is also called a mid-level diameter. The particle size distribution of the secondary particles of the lithium transition metal composite oxide can be measured by means of a laser diffraction type particle size distribution measuring device (e.g. MT3000II manufactured by MicrotracBEL Corp.) and by using water as the dispersion medium.

The particle size of the primary particles constituting the secondary particles is, for example, 0.05 μm to 1 μm. The particle size of the primary particles is measured as a diameter of a circle circumscribing a particle image observed by a scanning electron microscope (SEM).

The lithium transition metal composite oxide may have, for example, a layered structure belonging to the space group R-3m, a layered structure belonging to the space group C2/m, or the like. Among these, the layered structure belonging to the space group R-3m is preferable in terms of achieving high capacity, stability of crystal structure, and the like. The layered structure of the lithium transition metal composite oxide includes a transition metal layer, a Li layer, and an oxygen layer.

The lithium transition metal composite oxide at least contains Ni in an amount of 80 mol % or more relative to the total number of moles of metal elements excluding Li, and Al. By setting the ratio of Ni to the total number of moles of metal elements excluding Li in the lithium transition metal composite oxide to 80 mol % or more, a battery having a high capacity can be obtained.

The ratio of Ni to the total number of moles of metal elements excluding Li in the lithium transition metal composite oxide is preferably 90 mol % or more. With this feature, a battery Laving a higher capacity can be obtained.

The lithium transition metal composite oxide may be a composite oxide represented by general formula $Li_aNi_xAl_yCo_zM_wO_{2-b}$ (where $0.95<a<1.05$, $0.8 \leq x \leq 0.96$, $0<y \leq 0.10$, $0 \leq z \leq 0.15$, $0 \leq w \leq 0.1$, $0 \leq b < 0.05$, $x+y+z+w=1$, and M is at least one element selected from Mn, Fe, Ti, Si, Nb, Zr, Mo, and Zn). The positive electrode active material may contain lithium transition metal composite oxides other than that represented by the above general formula, or other compounds, so long as the object of the present disclosure is not impaired. The mole fractions of the metal elements contained in the entire particles of the lithium transition metal composite oxide are measured by inductively coupled plasma (ICP) emission spectroscopic analysis.

"a", which indicates the ratio of Li in the lithium transition metal composite oxide, preferably satisfies $0.95 \leq a < 1.05$, and more preferably satisfies $0.97 \leq a \leq 1.03$. When "a" is less than 0.95, the battery capacity may be decreased as compared to cases where "a" satisfies the above-noted range. When "a" is 1.05 or more, deterioration of the charge/discharge cycle characteristic may result as compared to cases where "a" satisfies the above-noted range.

"y", which indicates the ratio of Al to the total number of moles of metal elements excluding Li in the lithium transition metal composite oxide, preferably satisfies $0 < y \leq 0.10$, and more preferably satisfies $0.03 \leq y \leq 0.07$. Since Al does not change in oxidation number even during charging and discharging, it is considered that the structure of the transition metal layer is stabilized by having Al contained in the transition metal layer. On the other hand, when y exceeds 0.10, Al impurities may be generated and the battery capacity may become decreased. Further, when y is 0.07 or less, since the layered structure of the lithium transition metal composite oxide tends to be unstable, the effect of structural stabilization provided by containing either one of Sr or Ca is notably exhibited. Al may be, for example, uniformly dispersed in the layered structure of the lithium transition metal composite oxide, or may be present in a part of the layered structure.

Co and M (M is at least one element selected from Mn, Fe, Ti, Si, Nb. Zr, Mo, and Zn) are optional components. "z" and "w", which indicate the ratios of Co and M to the total number of moles of metal elements excluding Li in the lithium transition metal composite oxide, preferably satisfy $0 \leq z \leq 0.15$ and $0 \leq w \leq 0.1$, respectively. Since Co is expensive, it is preferable to suppress the Co content from the perspective of manufacturing costs.

The surface modification layer at least contains at least one of Sr or Ca, and Ba. The surface modification layer may contain, for example, Sr or a compound containing Sr, or Ca or a compound containing Ca. An example of the compound containing Sr may be SrO. An example of the compound containing Ca may be CaO. Further, the surface modification layer may contain, for example, Ba or a compound containing Ba. An example of the compound containing Ba may be BaO.

The surface modification layer may further contain Al. Al contained in the surface modification layer may be, for example, Al or a compound containing Al. An example of the compound containing Al may be $Al_2O_3$. Further, the compound containing Al may be a compound containing Al as well as Sr, Ca, or Ba, and examples thereof include $SrAlO_4$, $CaAlO_4$, and $BaAlO_4$. The surface modification layer may further contain Li.

The ratio of Sr and Ca in the surface modification layer can be, for example, 0.05 mol % to 0.25 mol % relative to the total number of moles of metal elements excluding Li in the lithium transition metal composite oxide. When within this range, a change can be imparted to the surface state of the lithium transition metal composite oxide by electronic interaction.

The ratio of Ba in the surface modification layer can be, for example, 0.000001 mol % to 0.00001 mol % in the lithium transition metal composite oxide. When within this range, the reaction resistance of the battery can be reduced and the output characteristic is improved. It is noted that, when Ba is in an amount in this range, although its presence can be confirmed by ICP, its content may not be quantitatively measurable due to the very small amount.

The thickness of the surface modification layer is, for example, 0.1 nm to 2 nm. When within this range, reaction with the electrolyte solution at the surface of the lithium transition metal composite oxide can be suppressed.

The content of the lithium transition metal composite oxide in the positive electrode active material is preferably 90% by mass or more, and more preferably 99% by mass or more, relative to the total mass of the positive electrode active material, in terms of, for example, improving the battery capacity and effectively suppressing deterioration of the charge/discharge cycle characteristic.

Further, the positive electrode active material of the present embodiment may contain other lithium transition metal composite oxides in addition to the lithium transition metal composite oxide of the present embodiment. Examples of other lithium transition metal composite oxides include lithium transition metal composite oxides having a Ni content of 0 mol % or more and less than 85 mol %.

Next, a description will be given regarding an example method for producing the positive electrode active material including the lithium transition metal composite oxide and the surface modification layer.

The method for producing the positive electrode active material comprises, for example: a first step of obtaining a composite oxide containing Ni, Al, and any optional metal element; a second step of obtaining a mixture by mixing the composite oxide obtained in the first step, a Li compound, and the like; and a third step of firing this mixture. Parameters such as the composition of the surface modification layer in the finally obtained positive electrode active material are adjusted by controlling, for example, the mixing ratio of the raw materials in the second step, the firing temperature and time in the third step, and the like.

In the first step, for example, while stirring a solution of a metal salt containing Ni, Al, and any optional metal element (Co, Mn, Fe, etc.), an alkaline solution such as sodium hydroxide is added dropwise thereto, and, by thus adjusting the pH to the alkaline side (for example 8.5 to 12.5), a composite hydroxide containing Ni, Al, and the optional metal element is precipitated (coprecipitated). By firing this composite hydroxide, a composite oxide containing Ni, Al, and the optional metal element is obtained. The firing temperature is not particularly limited, but is, for example, in the range from 300° C. to 600° C.

In the second step, a mixture is obtained by mixing the composite oxide obtained in the first step, a Li compound, a Sr compound or Ca, compound, and a Ba compound. Examples of the Li compound include $Li_2CO_3$, LiOH, $Li_2O_2$, $Li_2O$, $LiNO_3$, $LiNO_2$, $Li_2SO_4$, $LiOH \cdot H_2O$, LiH, and LiF. Examples of the Sr compound include $Sr(OH)_2$, $Sr(OH)_2 \cdot 8H_2O$, SrO, $SrCO_3$, $SrSO_4$, and $Sr(NO_3)_2$. Examples of the Ca compound include $Ca(OH)_2$, CaO, $CaCO_3$, $CaSO_4$, and $Ca(NO_3)_2$. Examples of the Ba compound include $Ba(OH)_2 \cdot H_2O$, BaO, $BaCO_3$, and $BaSO_4$. The mixing ratio of the composite oxide obtained in the first step and the Li compound is preferably such that, for example, the molar ratio of metal elements excluding Li to Li is set in the range from 1:0.98 to 1:1.1, in tetras of facilitating adjustment of the above respective parameters to the above-specified ranges. Further, the mixing ratio of the composite oxide obtained in the first step and at least one of the Sr compound or Ca compound is preferably such that, for example, the molar ratio of metal elements excluding Li to (Sr+Ca) is set in the range from 1:0.0005 to 1:0.0025, in terms of facilitating adjustment of the above respective parameters to the above-specified ranges. Further, the mixing ratio of the composite oxide obtained in the first step and the Ba compound is preferably such that, for example, the molar ratio of metal elements excluding Li to Ba is set in the range from 1:0.000001 to 1:0.00001, in terms facilitating adjustment of the above respective parameters to the above-specified ranges. In the second step, when mixing the composite oxide obtained in the first step, the Li compound, the Sr compound or Ca compound, and the Ba compound, some other metal raw material may be added as necessary. Such other metal raw material may be an oxide containing a metal element other than the metal elements constituting the composite oxide obtained in the first step, and the like.

In the third step, the mixture obtained in the second step is fired at a predetermined temperature for a predetermined time to obtain a positive electrode active material according to the present embodiment. The firing of the mixture in the third step comprises a multi-step firing process which includes, for example, a first firing step of firing the mixture in a firing furnace under an oxygen stream at a first heating rate up to a first preset temperature of 450° C. or higher and 680° C. or lower, and a second firing step of firing the fired product obtained in the first firing step in a firing furnace under an oxygen stream at a second heating rate up to a second preset temperature of higher than 680° C. and 800° C. or lower. Here, the first heating rate is in the range from 1.5° C./min or higher and 5.5° C./min or lower, while the second heating rate is lower than the first heating rate and is in the range from 0.1° C./min or higher and 3.5° C./min or lower. By means of such multi-step firing, parameters such as the composition of the surface modification layer in the finally obtained positive electrode active material of the present embodiment can be adjusted to within the above-specified ranges. Here, each of the first heating rate and the second heating rate may be set in a plural number for respective temperature regions so long as those rates are within the above-specified ranges. The holding time of the first preset temperature in the first firing step is preferably 0 hours or more and 5 hours or less, and more preferably 0 hours or more and 3 hours or less, in terms of adjusting the above respective parameters of the lithium transition metal composite oxide to the above-specified ranges. The holding time of the first preset temperature is the time during which the first preset temperature is maintained after the first preset temperature is reached. The holding time of the second preset temperature in the second firing step is preferably 1 hour or more and 10 hours or less, and more preferably 1 hour or more and 5 hours or less, in terms of adjusting the above respective parameters of the lithium transition metal composite oxide to the above-specified ranges. The holding time of the second preset temperature is the time during which the second preset temperature is maintained after the second preset temperature is reached. In terms of adjusting the above respective parameters to the above-specified ranges, the firing of the mixture can be performed, for example, in an oxygen stream having an oxygen concentration of 60% or higher, and the flow rate of the oxygen stream can be set to within the range from 0.2 mL/min to 4 mL/min per 10 $cm^3$ of the firing furnace and 0.3 L/min or more per 1 kg of the mixture.

The method for producing the positive electrode active material may include a washing step of washing the positive electrode active material with water after the third step. This washing step allows to remove an unreacted part of the Li compound and the like and any impurities from the positive electrode active material obtained in the third step. The washing step includes, for example, mixing the positive electrode active material with water so that the shiny cone titration is in the range from 500 g/L to 2000 g/L, then stirring the mixture for 3 minutes to 1 hour, and subsequently filtering the mixture. Further, a W compound or a W-containing solution may be added to the positive electrode active material after the washing step. By doing so, it is possible to further suppress formation of a structurally deteriorated layer and erosion at the surface of the lithium transition metal composite oxide due to reaction with the electrolyte solution and the like, and the charge/discharge cycle characteristic can be improved. Some Li compound remains in the positive electrode active material after the washing step, and the residual Li compound dissolves in the water contained in the positive electrode active material to form an alkaline aqueous solution. When a W compound is added to the positive electrode active material, the W compound dissolves in the alkaline aqueous solution and spreads over the entire surface of the positive electrode active material. Examples of the W compound include tungsten oxide ($WO_3$), lithium tungstate ($Li_2WO_4$, $Li_4WO_5$, Li$_6$W$_2$O$_9$), and the like. The amount of W added may be 0.5 mol % or less, and is preferably 0.3 mol % or less, relative to the total number of moles of metal elements excluding Li in the positive electrode active material. When a W-containing solution is to be added to the positive electrode active material, the W concentration in the W-containing solution is, for example, 0.05 mol/L or more, and preferably 0.1 mol/L to 1 mol/L. The W-containing solution is not particularly limited so long as it contains W, but is preferably a solution obtained by dissolving, in an aqueous solution of lithium hydroxide, a W compound that is easily soluble in an alkaline solution, such as tungsten oxide, lithium tungstate and ammonium tungstate.

The mole fractions of metal elements contained in the positive electrode active material obtained as above are measured by inductively coupled plasma (ICP) emission spectroscopic analysis, and can be represented by general formula Li$_a$Ni$_x$Al$_y$Co$_z$M2$_\alpha$Ba$_\beta$O$_{2-b}$ (where 0.95<a<1.05, 0.8≤x≤0.96, 0<y≤0.10, 0≤z≤0.15, 0≤w≤0.1, 0.05'α≤0.25, 0.0001≤β≤0.001, 0≤b<0.05, x+y+z+w=1, M1 is at least one element selected from Mn, Fe, Ti, Si, Nb, Mo, and Zn, and M2 is at least one element selected from Sr and Ca). It is noted that Sr is not dissolved in a solid solution state in the lithium transition metal composite oxide, but is contained in the surface modification layer present on the surface of the lithium transition metal composite oxide. Further, a part of Al may be contained in the surface modification layer.

[Negative Electrode]

The negative electrode 12 comprises a negative electrode current collector 40 and negative electrode active material layers 41 footed on both surfaces of the negative electrode current collector 40. As the negative electrode current collector 40, it is possible to use a foil of a metal stable in the potential range of the negative electrode 12 such as copper or a copper alloy, a film having such a metal disposed on its surface layers, or the like. The negative electrode active material layers 41 contain a negative electrode active material and a conductive material. The thickness of the negative electrode active material layers 41 is, for example, 10 μm to 150 μm on one side of the negative electrode current collector 40. The negative electrode 12 may be produced by applying a negative electrode slurry containing the negative electrode active material, the conductive material, and the like onto the surfaces of the negative electrode current collector 40, and, after drying the applied coating, rolling the applied coating to form negative electrode active material layers 41 on both surfaces of the negative electrode current collector 40.

The negative electrode active material contained in the negative electrode active material layers 41 is not particularly limited so long as it can reversibly occlude and release lithium ions. As the negative electrode active material, a carbon material such as graphite is generally used. The graphite may be either natural graphite such as scaly graphite, massive graphite, and earthy graphite, or artificial graphite such as massive artificial graphite and graphitized mesophase carbon microbeads. Further, as the negative electrode active material, a metal that alloys with Li such as Si and Sri, a metal compound containing Si, Sn, or the like, a lithium-titanium composite oxide, and the like may be used, and these materials having a carbon coating provided thereon may also be used. For example, in combination with graphite, a Si-containing compound represented by SiO$_x$ (where 0.5≤x≤1.6), a Si-containing compound in which fine particles of Si are dispersed in a lithium silicate phase represented by Li$_{2y}$SiO$_{(2+y)}$ (where 0<y<2), or the like may be used.

As the binder contained in the negative electrode active material layers 41, fluororesins such as PTFE and PVdF, PAN, polyimides, acrylic resins, polyolefins, and the like may be used as in the positive electrode 11, but styrene-butadiene rubber (SBR) is preferably used. The negative electrode active material layers 41 may further contain CMC or a salt thereof, polyacrylic acid (PAA) or a salt thereof, polyvinyl alcohol (PVA), and the like.

[Separators]

As the separators 13, for example, a porous sheet having ion permeability and insulating property is used. Specific examples of the porous sheet include a microporous thin film, a woven fabric, and a non-woven fabric. As the material for the separators, polyolefins such as polyethylene and polypropylene, cellulose, and the like are preferred. The separators 13 may have a single-layer structure or a laminated structure. Further, on the surface of the separators 13, there may be provided a highly heat-resistant resin layer made of aramid resin or the like, or a filler layer containing an inorganic compound filler.

[Non-Aqueous Electrolyte]

The non-aqueous electrolyte includes, for example, a non-aqueous solvent and an electrolyte salt dissolved in the non-aqueous solvent. As the non-aqueous solvent, it is possible to use, for example, an ester, an ether, a nitrile such as acetonitrile, an amide such as dimethylformamide, a mixed solvent containing two or more of the foregoing, or the like. The non-aqueous solvent may contain a halogen-substituted product obtained by substituting at least part of the hydrogens in the above solvents with halogen atoms such as fluorine. Examples of the halogen-substituted product include fluorinated cyclic carbonate esters such as fluoroethylene carbonate (FEC); fluorinated chain carbonate esters; and fluorinated chain carboxylate esters such as fluoro methyl propionate (FMP).

Examples of the above-noted ester include: cyclic carbonate esters such as ethylene carbonate (EC), propylene carbonate (PC), and butylene carbonate; chain carbonate esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL), and chain carboxylate esters such as methyl acetate, ethyl acetate, propyl acetate, methyl propionate (MP), and ethyl propionate (EP).

Examples of the above-noted ether include: cyclic ethers such as 1,3-dioxolane, 4-methyl-1,3-dioxolane, tetrahydrofuran, 2-methyltetrahydrofran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably lithium salt. Examples of lithium salt include LiBF$_4$, LiClO$_4$, LiPF$_6$, LiAsF$_6$, LiSbF$_6$, LiAlCl$_4$, LiSCN, LiCF$_3$SO$_3$, LiCF$_3$CO$_2$, Li(P(C$_2$O$_4$)F$_4$), LiPF$_{6-x}$(C$_n$F$_{2n+1}$)$_x$ (where 1<x<6, and n is 1 or 2). LiB$_{10}$Cl$_{10}$, LiCl, LiBr, LiI, chloroborane lithium, lower aliphatic lithium carboxylate, borate salts such as Li$_2$B$_4$O$_7$ and Li(B(C$_2$O$_4$)F$_2$), and halide salts such as LiN(SO$_2$CF$_3$)$_2$ and LiN($C_lF_{2l+1}SO_2$)($C_mF_{2m+1}SO_2$) (where l and in each are an integer of 0 or greater). As the lithium salt, a single type aiming the above may be used alone, or a plurality of types may be mixed and used. Among the foregoing, it is preferable to use $LiPF_6$ from the perspective of ionic conductivity, electrochemical stability, and the like. The concentration of the lithium salt is, for example, 0.8 mol to 1.8 mol per 1 liter of the non-aqueous solvent. Further, vinylene carbonate or a propane sultone based additive may be added.

EXAMPLES

While the present disclosure will now be further described with reference to Examples and Comparative Examples, the present disclosure is not limited to the Examples below.

Preparation of Positive Electrode Active Material

Example 1

A composite hydroxide represented by [$Ni_{0.82}Al_{0.05}Co_{0.13}$](OH)$_2$, which was obtained by a coprecipitation method, was fired at 500° C. for 8 hours to obtain a composite oxide ($Ni_{0.82}Al_{0.05}Co_{0.13}O_2$). Next, a mixture was obtained by mixing LiOH, the above composite oxide, Sr(OH)$_2$, and Ba(OH)$_2$ so that the molar ratio between Li; the total amount of Ni, Al, and Co; Sr; and Ba was 1.03:1:0.0005:0.000001. This mixture was fired under an oxygen stream having an oxygen concentration of 95% (with a flow rate of 2 mL/min per 10 cm$^3$ and 5 L/min per 1 kg of the mixture) from room temperature to 650° C. at a heating rate of 2.0° C./min, and then fired from 650° C. to 780° C. at a heating rate of 0.5° C./min. To this fired product, water was added so that the slurry concentration was 1500 g/L. This mixture was stirred for 15 minutes and then filtered, and a positive electrode active material was thereby obtained. Further, the composition of the positive electrode active material obtained as above was measured using an ICP emission spectroscopic analyzer (manufactured by Thermo Fisher Scientific Inc.; product name "iCAP6300"), and the results showed that the composition was $LiNi_{0.82}Al_{0.05}Co_{0.13}Sr_{0.0005}Ba_\beta O_2$. This product was used as the positive electrode active material of Example 1. Here, although it Was confirmed that Ba was contained in the positive electrode active material, the Ba content β was too small to be quantified. From the amount added, β is estimated to be about 0.000001.

[Production of Positive Electrode]

A positive electrode shiny was prepared by mixing 91 parts by mass of the positive electrode active material of Example 1, 7 parts by mass of acetylene black that serves as a conductive material, and 2 parts by mass of polvvinylidene fluoride that serves as a binder, and mixing this mixture with N-methyl-2-pyrrolidone (NMP). Next, this slurry was applied to a positive electrode current collector made of an aluminum foil having a thickness of 15 μm, and the applied coating was dried and then rolled using a roller. The product was cut into a predetermined electrode size, and a positive electrode having positive electrode active material layers formed on both surfaces of the positive electrode core was thereby obtained. An exposed portion where a surface of the positive electrode core was exposed was provided at a part of the positive electrode.

[Production of Negative Electrode]

As the negative electrode active material, natural graphite was used. A negative electrode slurry was prepared by mixing the negative electrode active material, sodium carboxymethyl cellulose (CMC-Na), and styrene-butadiene rubber (SBR) in an aqueous solution at a solid content mass ratio of 100:1:1. This negative electrode slurry was applied to both surfaces of a negative electrode core made of copper foil, and the applied coating was dried and then rolled using a roller. The product was cut into a predetermined electrode size, and a negative electrode having negative electrode active material layers formed on both surfaces of the negative electrode core was thereby obtained. An exposed portion where a surface of the negative electrode core was exposed was provided at a part of the negative electrode.

[Preparation of Non-Aqueous Electrolyte]

Ethylene carbonate (EC), methyl ethyl carbonate (MEC), and dimethyl carbonate (DMC) were mixed at a volume ratio of 3:3:4. A non-aqueous electrolyte was prepared by dissolving lithium hexafluorophosphate ($LiPF_6$) into this mixed solvent at a concentration of 1.2 mol/liter.

[Production of Test Cell]

An aluminum lead was attached to the exposed portion of the positive electrode containing the positive electrode active material of Example 1, and a nickel lead was attached to the exposed portion of the above-described negative electrode. The positive electrode and the negative electrode were spirally wound with a polyethylene separator disposed between these electrodes, and the product was shaped by, being pressed in a radial direction to produce a flat-shaped spiral-type electrode assembly. This electrode assembly was housed in an outer casing, and after injecting the above-described non-aqueous electrolyte therein, the opening of the outer casing was sealed to obtain a test cell.

[Measurement of Reaction Resistance]

With respect to the above-described test cell, under a temperature condition of 25° C., constant current charging was performed at 0.7 mA until the cell voltage reached 4.3 V, and then constant voltage charging was performed at 4.3V until the current value reached 0.07 mA. Subsequently, constant current discharging was performed at 0.7 mA until the cell voltage reached 2.5 V. Next, again under a temperature condition of 25° C., constant current charging was performed at 0.7 mA until the cell voltage reached 4.3 V, and then constant voltage charging was performed at 4.3V until the current value reached 0.07 mA. After that, AC impedance of the test cell at 20 kHz to 0.01 Hz was measured using an AC impedance measuring device. From the measured data, a Cole-Cole plot was drawn, and reaction resistance was determined based on the size of the arc between 10 Hz and 0.1 Hz. The reaction resistance values shown in Table 1 are such that the reaction resistance value of the test cell containing the positive electrode active material of Comparative Example 1 is assumed to be 100, and the reaction resistance values of the other test cells are expressed relative thereto.

[Evaluation of Capacity Retention Rate]

With respect to the above-described test cell, the following cycle test was conducted. The discharge capacity in the first cycle and the discharge capacity in the 100th cycle were determined, and the capacity retention rate was calculated by the following formula.

Capacity Retention Rate (%)=(Discharge Capacity in the 100th Cycle/Discharge Capacity in the 1st Cycle)×100

<Cycle Test>

Under a temperature condition of 45° C., the test cell was subjected to constant current charging with a constant current of 0.5 It until the battery voltage reached 4.2 V, and then subjected to constant voltage charging at 4.2V until the current value reached. 1/50 It. After that, constant current discharging was performed with a constant current of 0.5 It until the battery voltage reached 2.5 V. This charge/discharge cycle was repeated for 100 cycles.

Comparative Example 1

A positive electrode active material was obtained in the same manner as in Example 1 except that, in the step of obtaining the mixture (i.e., the second step), $Sr(OH)_2$ and $Ba(OH)_2$ were not added.

Comparative Example 2

A positive electrode active material was obtained in the same manner as in Example 1 except that, in the step of obtaining the mixture (i.e., the second step), $Sr(OH)_2$ was not added.

Comparative Example 3

A positive electrode active material was obtained in the same manner as in Example 1 except that, in the step of obtaining the mixture (i.e., the second step), $Ba(OH)_2$ was not added.

Example 2

A positive electrode active material was obtained in the same manner as in Example 1 except that a composite hydroxide represented by $[Ni_{0.88}Al_{0.03}Co_{0.09}](OH)_2$ was used to obtain a composite oxide $(Ni_{0.88}Al_{0.03}Co_{0.09}O_2)$, and a mixture was obtained by mixing LiOH, the above composite oxide, $Sr(OH)_2$, and $Ba(OH)_2$ so that the molar ratio between Li; the total amount of Ni, Al, and Co; Sr; and Ba was 1.03:1:0.001:0.000002. The composition of the obtained positive electrode active material was $LiNi_{0.88}Al_{0.03}Co_{0.09}Sr_{0.001}Ba_{\beta}O_2$. This product was used as the positive electrode active material of Example 2. As in Example 1, although it was confirmed that Ba was contained in the positive electrode active material, the Ba content $\beta$ was too small to be quantified. From the amount added, $\beta$ is estimated to be about 0.000002.

Example 3

A positive electrode active material was obtained in the same manner as in Example 2 except that, in the step of obtaining the mixture (i.e., the second step), $Ca(OH)_2$ was added instead of $Sr(OH)_2$.

Comparative Example 4

A positive electrode active material was obtained in the same manner as in Example 2 except that, in the step of obtaining the mixture (i.e., the second step), $Sr(OH)_2$ and $Ba(OH)_2$ were not added.

Comparative Example 5

A positive electrode active material was obtained in the same manner as in Example 2 except that, in the step of obtaining the mixture (i.e., the second step), $Sr(OH)_2$ was not added.

Comparative Example 6

A positive electrode active material was obtained in the same manner as in Example 2 except that, in the step of obtaining the mixture (i.e., the second step), $Ba(OH)_2$ was not added.

Comparative Example 7

A positive electrode active material was obtained in the same manner as in Example 2 except that, in the step of obtaining the mixture (i.e., the second step), $Ca(OH)_2$ was added instead of $Sr(OH)_2$, and $Ba(OH)_2$ was not added.

Example 4

A positive electrode active material was obtained in the same manner as in Example 1 except that a composite hydroxide represented by $[Ni_{0.91}Al_{0.04}Co_{0.05}](OH)_2$ was used to obtain a composite oxide $(Ni_{0.91}Al_{0.04}Co_{0.05}O_2)$, and a mixture was obtained by mixing LiOH, the above composite oxide, $Sr(OH)_2$, and $Ba(OH)_2$ so that the molar ratio between Li; the total amount of Ni, Al, and Co; Sr; and Ba was 1.03:1:0.0007:0.000004. The composition of the obtained positive electrode active material was $LiNi_{0.91}Al_{0.04}Co_{0.05}Sr_{0.0007}Ba_{\beta}O_2$. This product was used as the positive electrode active material of Example 4. As in Example 1, although it was confirmed that Ba was contained in the positive electrode active material, the Ba content $\beta$ was too small to be quantified. From the amount added, $\beta$ is estimated to be about 0.000004.

Example 5

A positive electrode active material was obtained in the same manner as in Example 4 except that, in the step of obtaining the mixture (i.e., the second step), a mixture was obtained by mixing LiOH, the composite oxide $(Ni_{0.91}Al_{0.04}Co_{0.05}O_2)$, $Sr(OH)_2$, and $Ba(OH)_2$, so that the molar ratio between Li; the total amount of Ni, Al, and Co; Sr; and Ba was 1.03:1:0.0015:0.000009.

Comparative Example 8

A positive electrode active material was obtained in the same manner as in Example 4 except that, in the step of obtaining the mixture (i.e., the second step), $Sr(OH)_2$ and $Ba(OH)_2$ were not added.

Comparative Example 9

A positive electrode active material was obtained in the same manner as in Example 4 except that, in the step of obtaining the mixture (i.e., the second step), $Sr(OH)_2$ was not added.

Comparative Example 10

A positive electrode active material was obtained in the same manner as in Example 4 except that, in the step of obtaining the mixture (i.e., the second step), $Ba(OH)_2$ was not added.

Comparative Example 11

A positive electrode active material was obtained in the same manner as in Example 5 except that, in the step of obtaining the mixture (i.e., the second step), Ba(OH)$_2$ was not added.

Example 6

A positive electrode active material was obtained in the same manner as in Example 1 except that a composite hydroxide represented by [Ni$_{0.91}$Al$_{0.055}$Co$_{0.035}$](OH)$_2$ was used to obtain a composite oxide (Ni$_{0.91}$Al$_{0.055}$Co$_{0.035}$O$_2$), and a mixture was obtained by mixing LiOH, the above composite oxide, Sr(OH)$_2$, and Ba(OH)$_2$, so that the molar ratio between Li; the total amount of Ni, Al, and Co; Sr; and Ba was 1.03:1:0.0007:0.00001. The composition of the obtained positive electrode active material was LiNi$_{0.91}$Al$_{0.055}$Co$_{0.035}$Sr$_{0.0007}$Ba$_\beta$O$_2$. This product was used as the positive electrode active material of Example 6. As in Example 1, although it was confirmed that Ba was contained in the positive electrode active material, the Ba content β was too small to be quantified. From the amount added, β is estimated to be about 0.00001.

Example 7

A positive electrode active material was obtained in the same manner as in Example 6 except that, in the step of obtaining the mixture (i.e., the second step), Ca(OH)$_2$ was added instead of Sr(OH)$_2$.

Comparative Example 12

A positive electrode active material was obtained in the same manner as in Example 6 except that, in the step of obtaining the mixture (i.e., the second step), Sr(OH)$_2$ and Ba(OH)$_2$ were not added.

Comparative Example 13

A positive electrode active material was obtained in the same manner as in Example 6 except that, in the step of obtaining the mixture (i.e., the second step), Sr(OH)$_2$ was not added.

Comparative Example 14

A positive electrode active material was obtained in the same manner as in Example 6 except that, in the step of obtaining the mixture (i.e., the second step), Ba(OH)$_2$ was not added.

Comparative Example 15

A positive electrode active material was obtained in the same manner as in Example 6 except that, in the step of obtaining the mixture (i.e., the second step), Ca(OH)$_2$ was added instead of Sr(OH)$_2$, and Ba(OH)$_2$ was not added.

Example 8

A positive electrode active material was obtained in the same manner as in Example 1 except that a composite hydroxide represented by [Ni$_{0.91}$Al$_{0.05}$Mn$_{0.04}$](OH)$_2$ was used to obtain a composite oxide (Ni$_{0.91}$Al$_{0.05}$Mn$_{0.04}$O$_2$), and a mixture was obtained by mixing LiOH, the above composite oxide, Sr(OH)$_2$, and Ba(OH)$_2$ so that the molar ratio between Li; the total amount of Ni, Al, and Co; Sr; and Ba was 1.03:1:0.0015:0.000004. The composition of the obtained positive electrode active material was LiNi$_{0.91}$Al$_{0.05}$Mn$_{0.04}$Sr$_{0.0015}$Ba$_\beta$O$_2$. This product was used as the positive electrode active material of Example 8. As in Example 1, although it was confirmed that Ba was contained in the positive electrode active material, the Ba content β was too small to be quantified. From the amount added, β is estimated to be about 0.000004.

Comparative Example 16

A positive electrode active material was obtained in the same manner as in Example 8 except that, in the step of obtaining the mixture (i.e., the second step), Sr(OH)$_2$ and Ba(OH)$_2$ were not added.

Comparative Example 17

A positive electrode active material was obtained in the same manner as in Example 8 except that, in the step of obtaining the mixture (i.e., the second step), Sr(OH)$_2$ was not added.

Comparative Example 18

A positive electrode active material was obtained in the same manner as in Example 8 except that, in the step of obtaining the mixture (i.e., the second step), Ba(OH)$_2$ was not added.

Example 9

A positive electrode active material was obtained in the same manner as in Example 1 except that a composite hydroxide represented by [Ni$_{0.925}$Al$_{0.05}$Mn$_{0.025}$](OH)$_2$ was used to obtain a composite oxide (Ni$_{0.925}$Al$_{0.05}$Mn$_{0.025}$O$_2$), and a mixture was obtained by mixing LiOH, the above composite oxide, Sr(OH)$_2$, and Ba(OH)$_2$ so that the molar ratio between Li; the total amount of Ni, Al, and Co; Sr; and Ba was 1.03:1:0.0018:0.000003. The composition of the obtained positive electrode active material was LiNi$_{0.925}$Al$_{0.05}$Mn$_{0.025}$Sr$_{0.0018}$Ba$_\beta$O$_2$. This product was used as the positive electrode active material of Example 9. As in Example 1, although it was confirmed that Ba was contained in the positive electrode active material, the Ba content β was too small to be quantified. From the amount added, β is estimated to be about 0.000003.

Comparative Example 19

A positive electrode active material was obtained in the same manner as in Example 9 except that, in the step of obtaining the mixture (i.e., the second step), Sr(OH)$_2$ and Ba(OH)$_2$ were not added.

Comparative Example 20

A positive electrode active material was obtained in the same manner as in Example 9 except that, in the step of obtaining the mixture (i.e., the second step), Sr(OH)$_2$ was not added.

Comparative Example 21

A positive electrode active material was obtained in the same manner as in Example 9 except that, in the step of obtaining the mixture (i.e., the second Step), Ba(OH)$_2$ was not added.

Reference Example 1

A positive electrode active material was obtained in the same manner as in Example 1 except that a composite hydroxide represented by [Ni$_{0.595}$Co$_{0.21}$Mn$_{0.195}$](OH)$_2$ was used to obtain a composite oxide (Ni$_{0.595}$Co$_{0.21}$Mn$_{0.195}$O$_2$) and a mixture was obtained by mixing LiOH, the above composite oxide, Sr(OH)$_2$, and Ba(OH)$_2$ so that the molar ratio between Li; the total amount of Ni, Al, and Co; Sr; and Ba was 1.03:1:0.0007:0.00001, The composition of the obtained positive electrode active material was LiNi$_{0.595}$Co$_{0.21}$Mn$_{0.195}$Sr$_{0.0007}$Ba$_\beta$O$_2$. This product was used as the positive electrode active material of Reference Example 1. As in Example 1, although it was confirmed that Ba was contained in the positive electrode active material, the Ba content β was too small to be quantified. From the amount added, β is estimated to be about 0.00001.

Reference Example 2

A positive electrode active material was obtained in the same manner as in Reference Example 1 except that, in the step of obtaining the mixture (i.e.; the second step), Sr(OH)$_2$ and Ba(OH)$_2$ were not added.

Reference Example 3

A positive electrode active material was obtained in the same manner as in Reference Example 1 except that, in the step of obtaining the mixture (i.e., the second step), Sr(OH)$_2$ was not added.

Reference Example 4

A positive electrode active material was obtained in the same manner as in Reference Example 1 except that, in the step of obtaining the mixture (i.e., the second step), Ba(OH)$_2$ was not added.

Reference Example 5

A positive electrode active material was obtained in the same manner as in Reference Example 1 except that, in the step of obtaining the mixture (i.e., the second step), Ca(OH)$_2$, was added instead of Sr(OH)$_2$.

The reaction resistance values and capacity retention rates of the Examples, Comparative Examples, and Reference Examples are shown in separate Tables 1 to 7. Tables 1 to 7 also show the results of ICP analysis of the obtained positive electrode active materials. The reaction resistance values and capacity retention rates of the test cells of Example 1 and Comparative Examples 2 and 3 shown in Table 1 are values expressed relative to the reaction resistance value and capacity retention rate of the test cell of Comparative Example 1, each of which is assumed to be 100.

The reaction resistance values and capacity retention rates of the test cells of Examples 2 and 3 and Comparative Examples 5 to 7 shown in Table 2 are values expressed relative to the reaction resistance value and capacity retention rate of the test cell of Comparative Example 4, each of which is assumed to be 100.

The reaction resistance values and capacity retention rates of the test cells of Examples 4 and 5 and Comparative Examples 9 to 11 shown in Table 3 are values expressed relative to the reaction resistance value and capacity retention rate of the test cell of Comparative Example 8, each of which is assumed to be 100.

The reaction resistance values and capacity retention rates of the test cells of Examples 6 and 7 and Comparative Examples 13 to 15 shown in Table 4 are values expressed relative to the reaction resistance value and capacity retention rate of the test cell of Comparative Example 12, each of which is assumed to be 100.

The reaction resistance values and capacity retention rates of the test cells of Example 8 and Comparative Examples 17 and 18 shown in Table 5 are values expressed relative to the reaction resistance value and capacity retention rate of the test cell of Comparative Example 16, each of which is assumed to be 100.

The reaction resistance values and capacity retention rates of the test cells of Example 9 and Comparative Examples 20 and 21 shown in Table 6 are values expressed relative to the reaction resistance value and capacity retention rate of the test cell of Comparative Example 19, each of which is assumed to be 100.

The reaction resistance values and capacity retention rates of the test cells of Reference Examples 1 and 3 to 5 shown in Table 7 are values expressed relative to the reaction resistance value and capacity retention rate of the test cell of Reference Example 2, each of Which is assumed to be 100.

TABLE 1

| | Positive Electrode Active Material | | | | | | Measurement Results | |
|---|---|---|---|---|---|---|---|---|
| | Added Elements | | Lithium Transition Metal Composite Oxide | | | | Reaction Resistance | Capacity Retention Rate |
| | Sr | Ba | Ni | Co | Al | Mn | | |
| Example 1 | 0.05 | Detected | 82.2 | 12.7 | 5.1 | 0 | 81 | 102.3 |
| Comparative Example 1 | — | Not Detected | 82.2 | 12.7 | 5.1 | 0 | 100 | 100 |
| Comparative Example 2 | — | Detected | 82.1 | 12.8 | 5.1 | 0 | 98 | 100.1 |
| Comparative Example 3 | 0.05 | Not Detected | 82.1 | 12.8 | 5.1 | 0 | 97 | 101.2 |

TABLE 2

| | Positive Electrode Active Material | | | | | | | Measurement Results | |
|---|---|---|---|---|---|---|---|---|---|
| | Added Elements | | | Lithium Transition Metal Composite Oxide | | | | Reaction Resistance | Capacity Retention Rate |
| | Sr | Ca | Ba | Ni | Co | Al | Mn | | |
| Example 2 | 0.1 | — | Detected | 88.1 | 8.9 | 3 | 0 | 72 | 102.5 |
| Example 3 | — | 0.1 | Detected | 88.1 | 8.9 | 3 | 0 | 74 | 103.7 |
| Comparative Example 4 | — | — | Not Detected | 88.1 | 8.9 | 3 | 0 | 100 | 100 |
| Comparative Example 5 | — | — | Detected | 88.1 | 8.9 | 3 | 0 | 97 | 100 |
| Comparative Example 6 | 0.1 | — | Not Detected | 88.1 | 8.9 | 3 | 0 | 98 | 101.3 |
| Comparative Example 7 | — | 0.1 | Not Detected | 88.1 | 8.9 | 3 | 0 | 99 | 101.5 |

TABLE 3

| | Positive Electrode Active Material | | | | | | | Measurement Results | |
|---|---|---|---|---|---|---|---|---|---|
| | Added Elements | | Lithium Transition Metal Composite Oxide | | | | | Reaction Resistance | Capacity Retention Rate |
| | Sr | Ba | Ni | Co | Al | Mn | | | |
| Example 4 | 0.07 | Detected | 91 | 5 | 4 | 0 | | 70 | 102.4 |
| Example 5 | 0.15 | Detected | 91 | 4.9 | 4.1 | 0 | | 64 | 104.8 |
| Comparative Example 8 | — | Not Detected | 91.1 | 5 | 3.9 | 0 | | 100 | 100 |
| Comparative Example 9 | — | Detected | 91.1 | 5 | 3.9 | 0 | | 98 | 99.9 |
| Comparative Example 10 | 0.07 | Not Detected | 91 | 5 | 4 | 0 | | 97 | 101.2 |
| Comparative Example 11 | 0.15 | Not Detected | 90.9 | 5 | 4.1 | 0 | | 95 | 102.5 |

TABLE 4

| | Positive Electrode Active Material | | | | | | | Measurement Results | |
|---|---|---|---|---|---|---|---|---|---|
| | Added Elements | | | Lithium Transition Metal Composite Oxide | | | | Reaction Resistance | Capacity Retention Rate |
| | Sr | Ca | Ba | Ni | Co | Al | Mn | | |
| Example 6 | 0.07 | — | Detected | 90.9 | 3.4 | 5.7 | 0 | 52 | 103.1 |
| Example 7 | — | 0.07 | Detected | 90.9 | 3.4 | 5.7 | 0 | 59 | 103.9 |
| Comparative Example 12 | — | — | Not Detected | 91 | 3.4 | 5.6 | 0 | 100 | 100 |
| Comparative Example 13 | — | — | Detected | 91 | 3.5 | 5.5 | 0 | 97 | 99.8 |
| Comparative Example 14 | 0.07 | — | Not Detected | 90.9 | 3.4 | 5.7 | 0 | 95 | 101.6 |
| Comparative Example 15 | — | 0.07 | Not Detected | 90.9 | 3.4 | 5.7 | 0 | 95 | 102.1 |

TABLE 5

| | Positive Electrode Active Material | | | | | | | Measurement Results | |
|---|---|---|---|---|---|---|---|---|---|
| | Added Elements | | Lithium Transition Metal Composite Oxide | | | | | Reaction Resistance | Capacity Retention Rate |
| | Sr | Ba | Ni | Co | Al | Mn | | | |
| Example 8 | 0.15 | Detected | 91 | 0 | 4.9 | 4.1 | | 77 | 102.7 |
| Comparative Example 16 | — | Not Detected | 91.1 | 0 | 4.9 | 4 | | 100 | 100 |

TABLE 5-continued

| | Positive Electrode Active Material | | | | | | Measurement Results | |
|---|---|---|---|---|---|---|---|---|
| | Added Elements | | Lithium Transition Metal Composite Oxide | | | | Reaction Resistance | Capacity Retention Rate |
| | Sr | Ba | Ni | Co | Al | Mn | | |
| Comparative Example 17 | — | Detected | 91 | 0 | 4.9 | 4.1 | 97 | 99.9 |
| Comparative Example 18 | 0.15 | Not Detected | 91 | 0 | 4.9 | 4.1 | 97 | 101.5 |

TABLE 6

| | Positive Electrode Active Material | | | | | | Measurement Results | |
|---|---|---|---|---|---|---|---|---|
| | Added Elements | | Lithium Transition Metal Composite Oxide | | | | Reaction Resistance | Capacity Retention Rate |
| | Sr | Ba | Ni | Co | Al | Mn | | |
| Example 9 | 0.18 | Detected | 92.5 | 0 | 5.2 | 2.3 | 86 | 102.9 |
| Comparative Example 19 | — | Not Detected | 92.5 | 0 | 5.2 | 2.3 | 100 | 100 |
| Comparative Example 20 | — | Detected | 92.4 | 0 | 5.2 | 2.4 | 99 | 100.1 |
| Comparative Example 21 | 0.18 | Not Detected | 92.5 | 0 | 5.2 | 2.3 | 97 | 101.7 |

TABLE 7

| | Positive Electrode Active Material | | | | | | | Measurement Results | |
|---|---|---|---|---|---|---|---|---|---|
| | Added Elements | | | Lithium Transition Metal Composite Oxide | | | | Reaction Resistance | Capacity Retention Rate |
| | Sr | Ca | Ba | Ni | Co | Al | Mn | | |
| Reference Example 1 | 0.07 | — | Detected | 59.4 | 21.1 | 0 | 19.5 | 97 | 100.1 |
| Reference Example 2 | — | — | Not Detected | 59.5 | 21 | 0 | 19.5 | 100 | 100 |
| Reference Example 3 | — | — | Detected | 59.5 | 21 | 0 | 19.5 | 99 | 99.8 |
| Reference Example 4 | 0.07 | — | Not Detected | 59.4 | 21 | 0 | 19.6 | 98 | 100 |
| Reference Example 5 | — | 0.07 | Detected | 59.4 | 21.1 | 0 | 19.5 | 96 | 100.2 |

In each of Tables 1 to 6, the Example containing Sr and Ba in the surface modification layer had a lower reaction resistance and a higher capacity retention rate than the Comparative Examples not containing at least one of Sr or Ba in the surface modification layer. In Table 7, since the lithium transition metal composite oxides in all of Reference Examples 1 to 5 did not contain Al, the reaction resistance values and the capacity retention rates did not change depending on whether or not Sr and Ba were added.

REFERENCE SIGNS LIST 10 non-aqueous electrolyte secondary battery
11 positive electrode
12 negative electrode
13 separator
14 electrode assembly
15 battery housing
16 outer can
17 sealing assembly
18, 19 insulating plate
20 positive electrode tab
21 negative electrode tab
22 grooved portion
23 bottom plate
24 lower valve member
25 insulating member
26 upper valve member
27 cap
28 gasket
30 positive electrode current collector
31 positive electrode active material layer
40 negative electrode current collector
41 negative electrode active material layer

The invention claimed is:

1. A positive electrode active material for non-aqueous electrolyte secondary battery, comprising:
 a lithium transition metal composite oxide having secondary particles formed by agglomeration of primary particles; and
 a surface modification layer formed on a surface of the primary particles of the lithium transition metal composite oxide, wherein
 the lithium transition metal composite oxide at least contains Ni in an amount of 80 mol % or more relative to a total number of moles of metal elements excluding Li, and Al; and
 the surface modification layer at least contains Ba and at least one element selected from the group consisting of Sr and Ca.

2. The positive electrode active material for non-aqueous electrolyte secondary battery according to claim 1, wherein the surface modification layer further contains Al.

3. The positive electrode active material for non-aqueous electrolyte secondary battery according to claim 1, wherein the lithium transition metal composite oxide is represented by general formula $Li_aNi_xAl_yCo_zM_wO_{2-b}$ (where $0.95<a<1.05$, $0.8\leq x\leq 0.96$, $0<y\leq 0.10$, $0\leq z\leq 0.15$, $0\leq w\leq 0.1$, $0\leq b<0.05$, $x+y+z+w=1$, and M is at least one element selected from Mn, Fe, Ti, Si, Nb, Zr, Mo, and Zn).

4. The positive electrode active material for non-aqueous electrolyte secondary battery according to claim 1, wherein a ratio of Sr and Ca in the surface modification layer is 0.05 mol % to 0.25 mol % relative to the total number of moles of metal elements excluding Li in the lithium transition metal composite oxide.

5. The positive electrode active material for non-aqueous electrolyte secondary battery according to claim 1, wherein a ratio of Ni to the total number of moles of metal elements excluding Li in the lithium transition metal composite oxide is 90 mol % or more.

6. A non-aqueous electrolyte secondary battery comprising a positive electrode including the positive electrode active material for non-aqueous electrolyte secondary battery according to claim 1, a negative electrode, and a non-aqueous electrolyte.

7. The positive electrode active material for non-aqueous electrolyte secondary battery according to claim 1, wherein the surface modification layer has a thickness of greater than or equal to 0.1 nm and less than or equal to 2 nm.

8. The positive electrode active material for non-aqueous electrolyte secondary battery according to claim 1, wherein the surface modification layer contains at least one of the group consisting of BaO, CaO and SrO.

* * * * *